F. W. PERRY.

Assignor, to W. A. LEAVITT.

Bottle-Stopper.

No. 8,061. Reissued Jan. 29, 1878.

Witnesses,
Harry Smith
John W. Wemer

Inventor
Frank W. Perry
by his Attorneys
Howson and Sons

N. PETERS, PHOTO-LITHOGRAPHER, WASHINGTON, D. C.

UNITED STATES PATENT OFFICE.

FRANK W. PERRY, OF PHILADELPHIA, PENNSYLVANIA, ASSIGNOR TO WILLIAM A. LEAVITT, OF SAME PLACE.

IMPROVEMENT IN BOTTLE-STOPPERS.

Specification forming part of Letters Patent No. 197,890, dated December 4, 1877; Reissue No. 8,061, dated January 29, 1878; application filed January 12, 1878.

*To all whom it may concern:*

Be it known that I, FRANK W. PERRY, of Philadelphia, Pennsylvania, have invented a new and useful Improvement in Bottle-Stoppers, of which the following is a specification:

My invention relates to an improvement in that class of bottle-stoppers in which a lever adapted to a collar on the neck of the bottle is caused to depress the stopper on the edge of the mouth; and the objects of my invention are, first, to so combine a slotted lever with projections on the collar and stopper that the latter can be tightly compressed by a slight exertion on the lever; second, to so construct the said collar that it can be readily applied to and disconnected from the neck of the bottle; and, third, to construct the operating-lever of a stoppering device in the peculiar manner described hereinafter.

Figure 1:
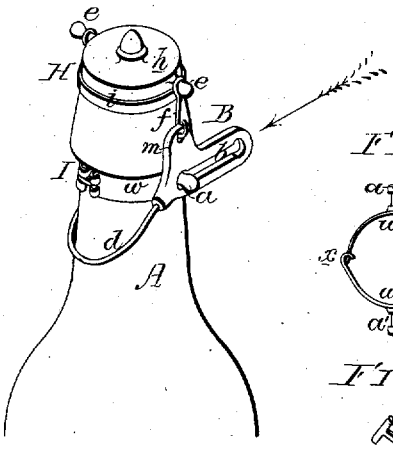
Figure 2:
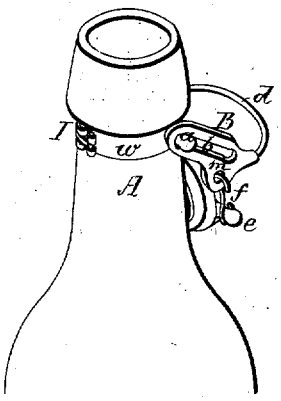
Figure 4:
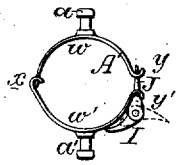
Figure 3:
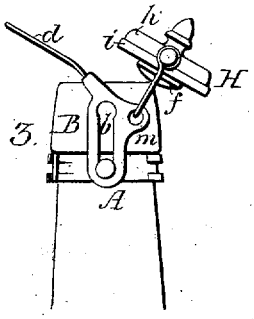

In the accompanying drawing, Figures 1 and 2 are perspective views of a bottle with my improved stopper; Fig. 3, a side view; Fig. 4, a plan view of the collar; and Fig. 5, a perspective view of the device for securing the collar.

The collar A′ may be made in two parts, secured together in the manner described hereinafter; or it may be constructed for attachment to the neck A of the bottle in any of the modes now adopted in connection with bottle-stoppers of the class to which my invention relates. In all cases, however, the collar must have opposite projections or trunnions *a a′*, adapted to the slots *b* of the two arms B B, which are arranged on opposite sides of and close to the bottle, and are connected together by the bent wire or yoke, the latter, with the arms, constituting the operating-lever, the mode of constructing which is referred to hereinafter.

H is the stopper, the upper portion of which is made of metal and the lower portion of rubber, as usual, the metal portion having opposite projections *e e*, which are connected by links *f* to eyes *m* on the operating-lever.

In adjusting the stopper to the mouth of the bottle, as shown in Fig. 3, the operating-lever must be elevated, the lower ends of the slots being in contact, or nearly so, with the projections of the collar, so that the rubber of the stopper may pass freely over the edge of the mouth preparatory to being placed on the mouth itself, after which the lever is depressed from about the position shown in Fig. 3 to that seen in the perspective view, Fig. 1, when the stopper will be firmly secured to the mouth of the bottle.

In thus depressing the lever B it acts with a constantly-changing fulcrum for, as the lever is depressed, the arms B slide on the fulcrum-projections *a*, and the eyes *m* approach nearer and nearer to the said fulcrums until the inner ends of the slots in the arms reach the projections *a*, as shown in Fig. 1, when the eyes *m* bear such relation to the said projections that the stopper will be locked firmly to the mouth of the bottle, from which it cannot be detached without first raising the lever or pushing its arms B in the direction of the arrow, Fig. 1, by doing which the stopper may be released and afterward thrown back, so as to hang down on the neck of the bottle, where it cannot be any impediment to the filling of the bottle. (See Fig. 2.)

There is an advantage in this constantly-increasing leverage exerted on the stopper as the lever is depressed, for, as the compression of the rubber increases, the leverage increases, and hence the desired tight joint is completed by a comparatively slight effort, the releasing of the stopper being also effected with very little exertion.

Figure 5:
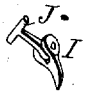

The collar A′ is made in two parts or segments, *w* and *w′*. These are loosely hooked or permanently hinged together at *x;* but the other ends of the segments are connected together by a T-headed link, J, and cam-lever I, as shown in Figs. 4 and 5. The T-head of the link is connected to the slotted and hooked end *y* of the segment *w*, and the stem of the link inserted into the slot of the hooked end *y′* of the segment *w′*, against which hook bears the cam of the lever I, which is hinged to the link.

By turning this lever from the position shown by dotted lines to that shown by plain lines in Fig. 4, the segments are made to tightly embrace the neck of the bottle, and after turning the lever in a contrary direction the pressure will be removed from the segments, and the latter may be withdrawn from the neck of the bottle.

The operating-lever consists of three parts—namely, the end pieces or arms B B, of cast metal, and the wire or yoke *d*, united to the end pieces during the process of casting the same.

I claim as my invention—

1. The combination of projections *a a'* on the neck of the bottle and like projections *e e* on the stopper with connected arms B B, having slots adapted to the said projections *a*, and with links by which the stopper is connected to the arms, all substantially as set forth.

2. The collar A', made in two segments, connected together at one end, and combined at the other end with the link J and cam-lever I.

3. An operating-lever for bottle-stoppers, said lever consisting of a wire or yoke, *d*, and cast-metal end pieces or arms B B, as specified.

4. The cast-metal arms B B, each provided with a slot, *b*, and eye *m*, as described.

In testimony whereof I have signed my name to this specification in the presence of two subscribing witnesses.

FRANK W. PERRY.

Witnesses:
HARRY A. CRAWFORD,
HARRY SMITH.